United States Patent
Fukasaka et al.

(10) Patent No.: US 6,867,800 B1
(45) Date of Patent: Mar. 15, 2005

(54) SYSTEM HAVING AN INFORMATION PROCESSING APPARATUS AND A DATA INPUT APPARATUS, AND METHOD FOR CONTROLLING THE SYSTEM

(75) Inventors: Toshihiro Fukasaka, Tokyo (JP); Yasuo Suzuki, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,917

(22) Filed: Feb. 19, 1998

(30) Foreign Application Priority Data

Feb. 21, 1997 (JP) .............................................. 9-037751
Feb. 21, 1997 (JP) .............................................. 9-037752

(51) Int. Cl.$^7$ .............................................. H04N 5/225
(52) U.S. Cl. .................. 348/207.1; 348/220.1
(58) Field of Search .............................. 348/207, 220, 348/222, 231, 552, 373, 374, 375, 207.99, 207.1, 207.11, 220.1, 222.1, 231.99, 231.2, 223.1; 354/473, 474; H04N 5/225

(56) References Cited

U.S. PATENT DOCUMENTS

| 5,475,441 A | * 12/1995 | Parulski et al. ............. 348/552 |
| 5,708,515 A | * 1/1998 | Nishiura ..................... 358/473 |
| 6,005,613 A | * 12/1999 | Endsley et al. ............. 348/231 |
| 6,300,976 B1 | * 10/2001 | Fukuoka ..................... 348/232 |
| 6,327,001 B1 | * 12/2001 | Yamagishi .................. 348/158 |

* cited by examiner

Primary Examiner—Tuan Ho
(74) Attorney, Agent, or Firm—Morgan & Finnegan, LLP

(57) ABSTRACT

When a shutter button of a camera is pressed, an application execution signal is transmitted from the camera to a computer which is connected to the camera. If an application corresponding to the application execution signal is not being executed, the computer automatically executes the application which is stored in a hard disk in response to reception of the application execution signal.

45 Claims, 14 Drawing Sheets

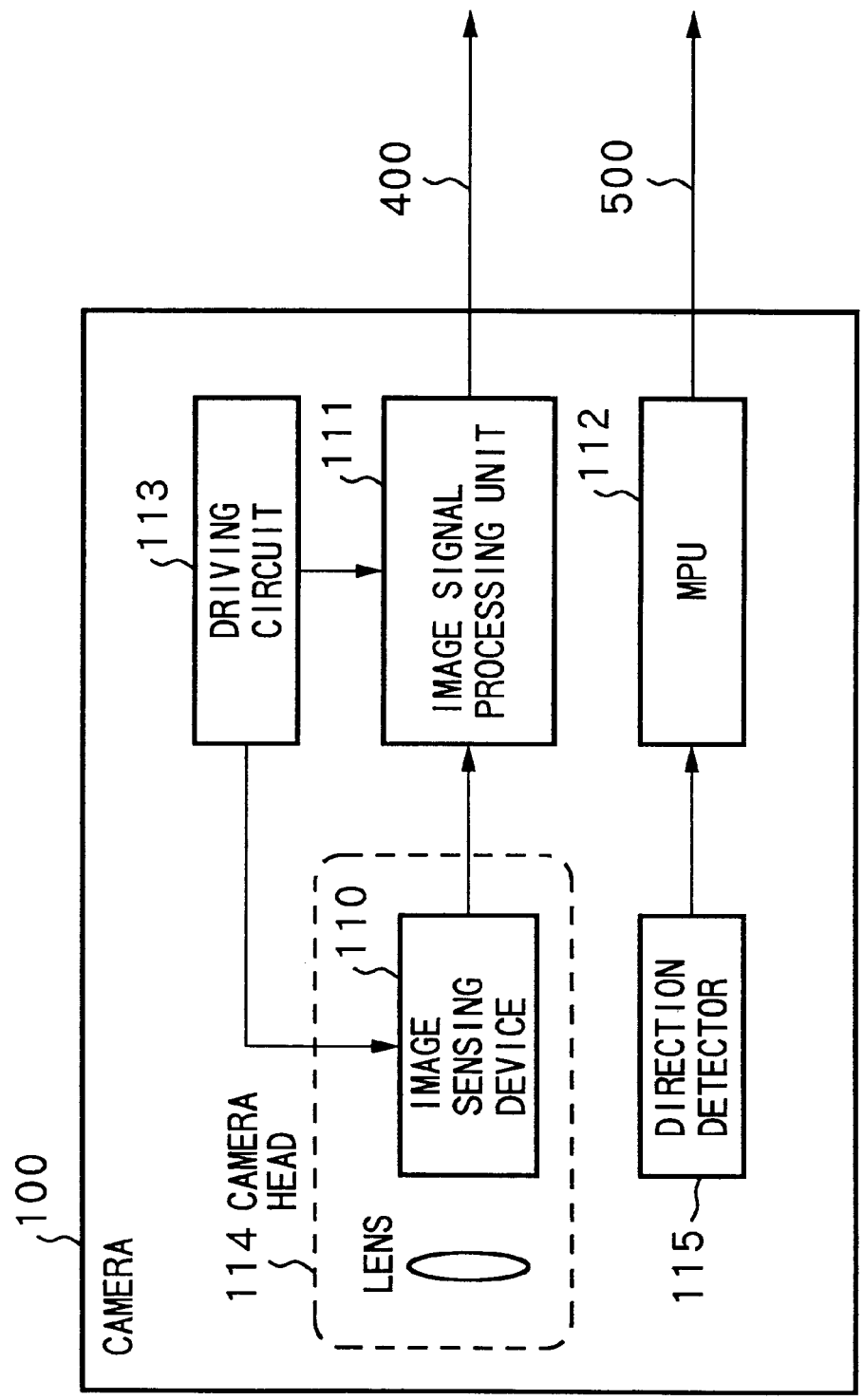

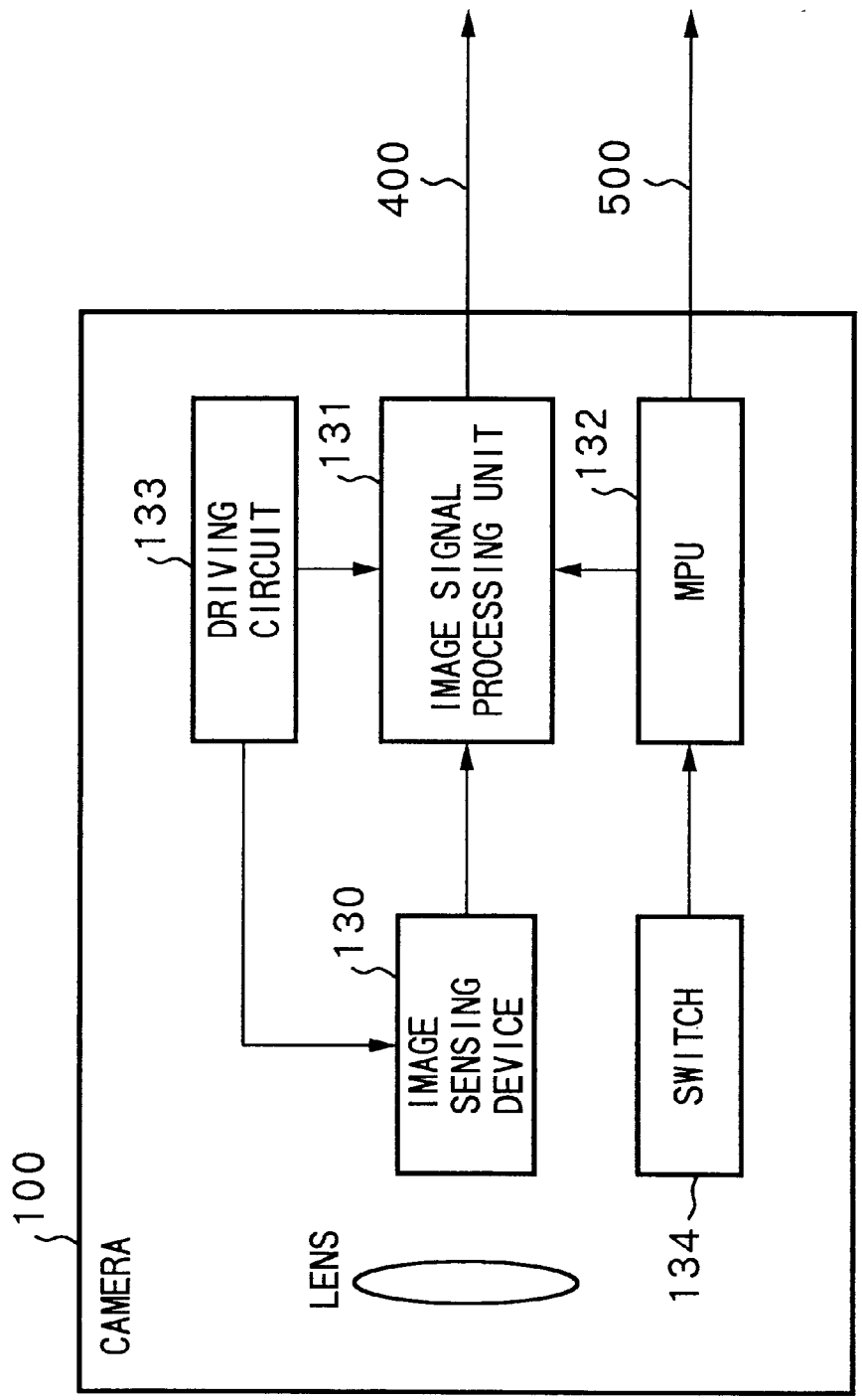

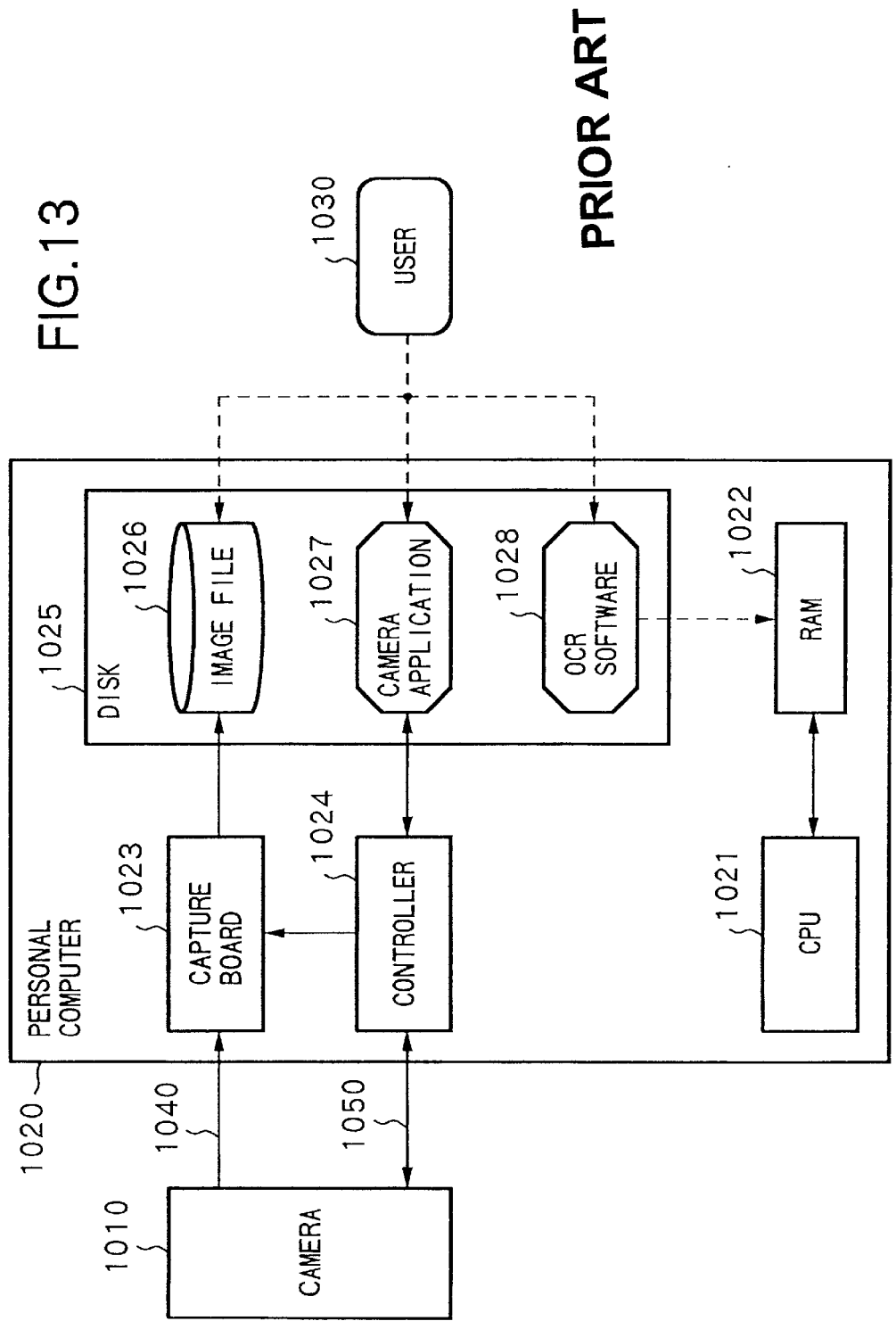

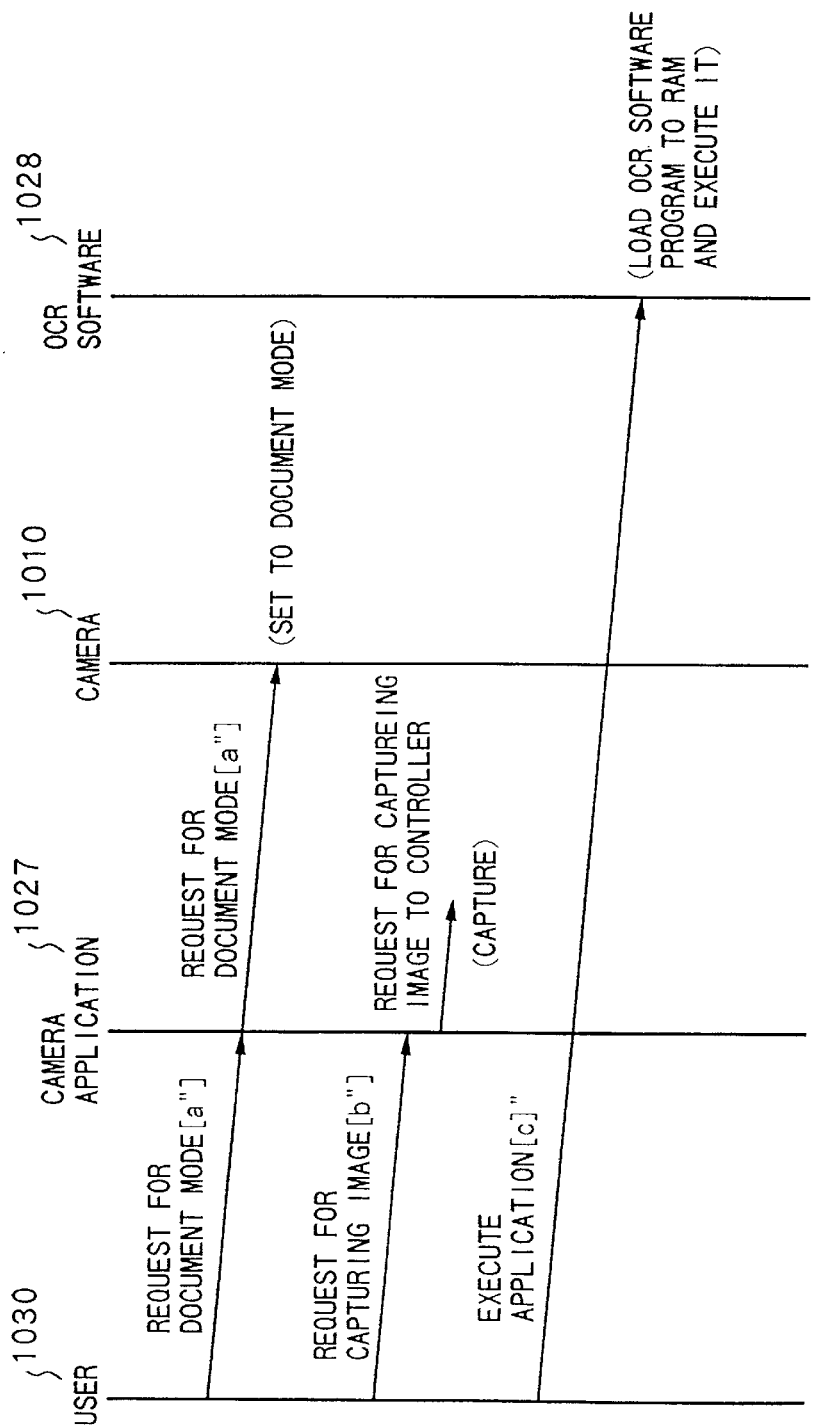

SYSTEM HAVING AN INFORMATION PROCESSING APPARATUS AND A DATA INPUT APPARATUS, AND METHOD FOR CONTROLLING THE SYSTEM

BACKGROUND OF THE INVENTION

The present invention relates to a system having an information processing apparatus and a data input apparatus, and a method for controlling the system and, more particularly, to a system capable of automatically executing a predetermined application program in an information processing apparatus in accordance with an operation by a data input apparatus, and a method for controlling the system.

Conventionally, in an image sensing system having an image sensing apparatus (data input apparatus), such as a CCD camera, a computer and a monitor, for executing an application program, such as a TV conference and a TV phone application programs, a user double-clicks on an icon of the application displayed on the monitor or inputs a command via a keyboard.

In the above conventional example, however, for executing a TV conference application program or a TV phone application program, for instance, the user has to operate the computer, e.g., search the desired icon and operate a mouse or input a command using the keyboard. In this manner, the user has to operate both the image sensing apparatus and the computer; turn on the image sensing apparatus, and instruct the computer to execute a desired application program.

Further, there is a demand for a camera capable of sensing a moving image of a person and landscape as well as a high-resolution still image of a document, for example, as an image sensing device to be used in the TV conference system and the TV phone system.

In response, as an image sensing apparatus for a TV conference system or a TV phone, a computer camera having a document mode (for inputting a document in high resolution) and a non-document mode (for inputting a still image and a moving image in general) and capable of performing bidirectional communication with a personal computer is on the market. Such a camera senses a person and landscape, for instance, in the non-document mode, whereas, senses a document which is often written in monochromatic color in the document mode.

A few examples of the document modes and the non-document modes are briefly explained below. In one image sensing apparatus, normal color processing is performed in the non-document mode, whereas mono-chromatic processing is performed in the document mode. Further, an image sensing apparatus capable of performing so-called pixel shifting operation for obtaining a single high-resolution image by synthesizing a plurality of images sensed in a lower resolution while shifting image formation position on an image sensing device, such as a CCD, is available. Camera operation and image processing as in a common video camera are performed without performing the pixel shifting operation in the non-document mode, whereas a high-resolution image is obtained by performing pixel shifting operation using a plane parallel plate, for instance, in the document mode.

When a document is sensed in the document mode, possible ways of using the sensed image of the document are as follows.

(1) Sensed image file is generated as images are obtained.

(2) An application for processing the document of the sensed image is executed. For example, an optical character recognition reader (OCR) software is applied to the document image to obtain a text file.

When applicability and convenience are considered, the processing (2) is often performed. A block diagram illustrating a brief configuration of a system capable of performing the processing (2) is shown in FIG. 13, and a flowchart of a typical operation of the system is shown in FIG. 14.

In FIG. 13, reference numeral 1010 denotes a camera capable of operating in the document mode and the non-document mode; 1020, a personal computer; 1021, a CPU; 1022, a RAM; 1023, a capture board for capturing an image sensed by the camera 1010; 1024, a controller for controlling the camera 1010 and the capture board 1023; 1025, a disk; 1026, an image file of the captured image; 1027, a user interface (camera application) for controlling the camera or other units; 1028, an OCR software which is frequently used after capturing an image of a document; and 1030, a user.

Next, a typical operation for capturing a document image is explained with reference to FIGS. 13 and 14. First, the user 1030 inputs a request to sense in the document mode [a"]. At this time, image sensing mode of the camera 1010 changes from the non-document mode to the document mode. Then, the user 1030 inputs a request for capturing a sensed document image [b"], in turn, the document image is captured and stored as the image file 1026. Here, an operation for converting the document file 1026 into a text file using an OCR software is often performed. The user 1030 executes the OCR software 1028 to convert the image file 1026 into a text file.

As described above, after a document is sensed in the document mode, an application software for performing some processing on the document image is frequently executed.

However, since control of the image input apparatus (by camera application) which senses a document, and an application, such as an OCR software, operate independently, in general, it is necessary to initiate the latter application each time a document is sensed. Since an application, such as the OCR software, for processing a document image is frequently used after documents are sensed, the process for initiating the application each time is quite wasteful.

SUMMARY OF THE INVENTION

The present invention has been made in consideration of the above situation, and has as its object to provide a system, having an information processing apparatus and a data input apparatus, capable of automatically executing a predetermined application program in the information processing apparatus in response to an operation in the data input apparatus, and a method for controlling the system.

According to the present invention, the foregoing object is attained by providing an image sensing apparatus capable of connecting to an information processing apparatus comprising: operation means; signal generation means for generating a predetermined signal used for requesting to execute a predetermined application in the information processing apparatus in response to an operation of the operation means; and communication means for sending the predetermined signal generated by the signal generation means externally.

According to the present invention, the foregoing object is also attained by providing a system having an information processing apparatus and a data input apparatus, said system comprising: operation means; signal generation means for generating a predetermined signal in response to an operation of the operation means; communication means for transmitting the predetermined signal generated by the signal generation means from the data input apparatus to the information processing apparatus; and control means for automatically executing a predetermined application in response to the predetermined signal transmitted via the communication means.

Further, according to the present invention, the foregoing object is also attained by providing a method for controlling an information processing apparatus capable of connecting to an external data input apparatus, said method comprising: a receiving step of receiving a signal from the external data input apparatus; and a control step of executing a predetermined application when a predetermined signal is received in the receiving step.

Furthermore, according to the present invention, the foregoing object is also attained by providing a method for controlling a system having an information processing apparatus and a data input apparatus, the method comprising: a detecting step of detecting a predetermined operation in the data input apparatus; a generating step of generating a predetermined signal used for requesting to execute a predetermined application in the information processing apparatus when the predetermined operation is detected in the detecting step; a communication step of transmitting a predetermined signal from the data input apparatus to the information processing apparatus; and a control step of executing a predetermined application in the information processing apparatus on the basis of the predetermined signal transmitted in the communication step.

It is another object of the present invention to provide a system, having an information processing apparatus and a data input apparatus, capable of automatically executing a predetermined application program in the information processing apparatus when the data input apparatus, capable of operating in a plurality of modes, starts operating in a predetermined mode, and a method for controlling the system.

According to the present invention, the foregoing object is attained by providing an image sensing apparatus capable of operating in a plurality of operational modes and connecting to an information processing apparatus, comprising: signal generation means for generating a predetermined signal indicating that the image sensing apparatus starts operating in a predetermined mode; and communication means for sending the predetermined signal generated by the signal generation means externally.

According to the present invention, the foregoing object is also attained by providing a system having an information processing apparatus and a data input apparatus capable of operating in a plurality of operational modes, said system comprising: control means for automatically executing a predetermined application corresponding to a predetermined operational mode out of the plurality of operational modes when the data input apparatus starts operating in the predetermined operational mode.

Further, according to the present invention, the foregoing object is also attained by providing a method for controlling an information processing apparatus capable of connecting to an external data input apparatus capable of operating in a plurality of operational modes, said method comprising: a control step of automatically executing a predetermined application corresponding to a predetermined operational mode out of the plurality of operational modes when the external data input apparatus starts operating in the predetermined operational mode.

Furthermore, according to the present invention, the foregoing object is also attained by providing a method for controlling a system having an information processing apparatus and a data input apparatus capable of operating in a plurality of operational modes, said method comprising: a control step of automatically executing a predetermined application corresponding to a predetermined operational mode out of the plurality of operational modes when the data input apparatus starts operating in the predetermined operational mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 a block diagram illustrating a configuration of a camera used in the image sensing system shown in FIG. 5 according to the third embodiment of the present invention;

FIG. 12 a block diagram illustrating another configuration of a camera used in the image sensing system shown in FIG. 5 according to the third embodiment of the present invention;

FIG. 13 is a block diagram illustrating a configuration of a conventional image sensing system; and FIG. 14 is an explanatory view showing an operational sequence of the conventional image sensing system.

DETAILED DESCRIPTION OF THE PREFERRED EMBODIMENTS

Preferred embodiments of the present invention will be described in detail in accordance with the accompanying drawings.

Note, the present invention will be explained as an image sensing system, however, the present invention is not limited to the image sensing system and can be applied to a system comprising an information processing apparatus and a data input apparatus. Further, the present invention can be in a form of a storage medium storing a program realizing the effects of the present invention.

First Embodiment

Figure 1:
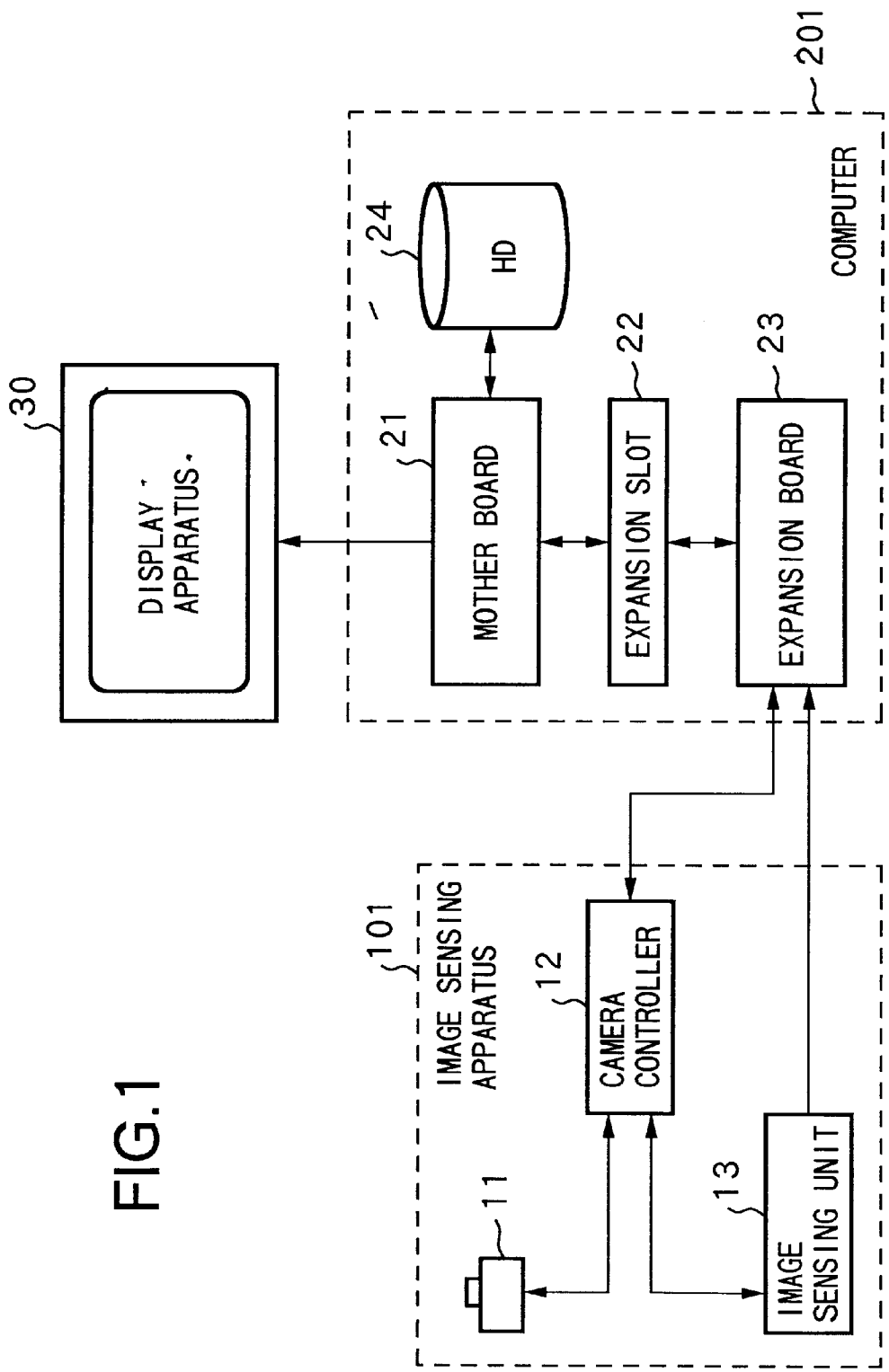
FIG. 1 is a block diagram illustrating a configuration of an image sensing system according to a first embodiment of the present invention.

FIG. 1 is a block diagram illustrating a configuration of an image sensing system according to the first embodiment of the present invention.

Referring to FIG. 1, the system comprises an image sensing apparatus 101, a computer (control apparatus) 201, and a display apparatus 30. The image sensing apparatus 101 includes: an image sensing unit 13 for sensing an object and transmitting an image signal; a camera controller 12 for controlling the overall operation of the image sensing apparatus 101; and a shutter button 11 for switching the type of image signal, transmitted from the image sensing unit 13, from a moving image to a still image. The computer 201 includes: a mother board 21 which is a main processing unit; an expansion slot 22; an expansion board 23 for connecting to the image sensing apparatus 101; and a hard disk 24 for storing an operating system, application programs, data, and so on. The display apparatus 30 displays an image sensed by the image sensing apparatus 101 and dialog of the application program being executed on the computer 201.

Next, an operation of the image sensing system is explained. When the shutter button 11 of the image sensing apparatus 101 is pressed, the camera controller 12 detects the operation. In turn, the camera controller 12 transmits an application execution request signal to the expansion board 23 as well as changes the image signal to be transmitted from the image sensing unit 13 from a moving image signal to a still image signal. Note, after image signals corresponding to one frame of still image are outputted, moving image signals are outputted until the shutter button 11 is pressed next time.

When receiving the application execution request signal, the expansion board 23 requests the mother board 21 to execute a predetermined application program, which is set, in advance, to be executed in response to the application execution request signal via the expansion slot 22 if the application program is not running currently. In turn, the mother board 21 executes the predetermined application program stored in the hard disk 24. After the application program is initiated, an image transmitted from the image sensing unit 13 of the image sensing apparatus 101 and dialog between a user and the application executed on the computer 201 are displayed on the display apparatus 30.

According to the first embodiment as described above, in an image sensing system which processes image data, inputted by an image sensing apparatus, using a predetermined application executed on a computer, when the application is not being executed, the program is automatically initiated by pressing a shutter button of the image sensing apparatus without interfacing with the operator. The program is a predetermined application program, such as a TV conference application program or a TV phone application program, and is set to be executed in response to the operation of the image sensing apparatus.

First Modification of the First Embodiment

Figure 2:
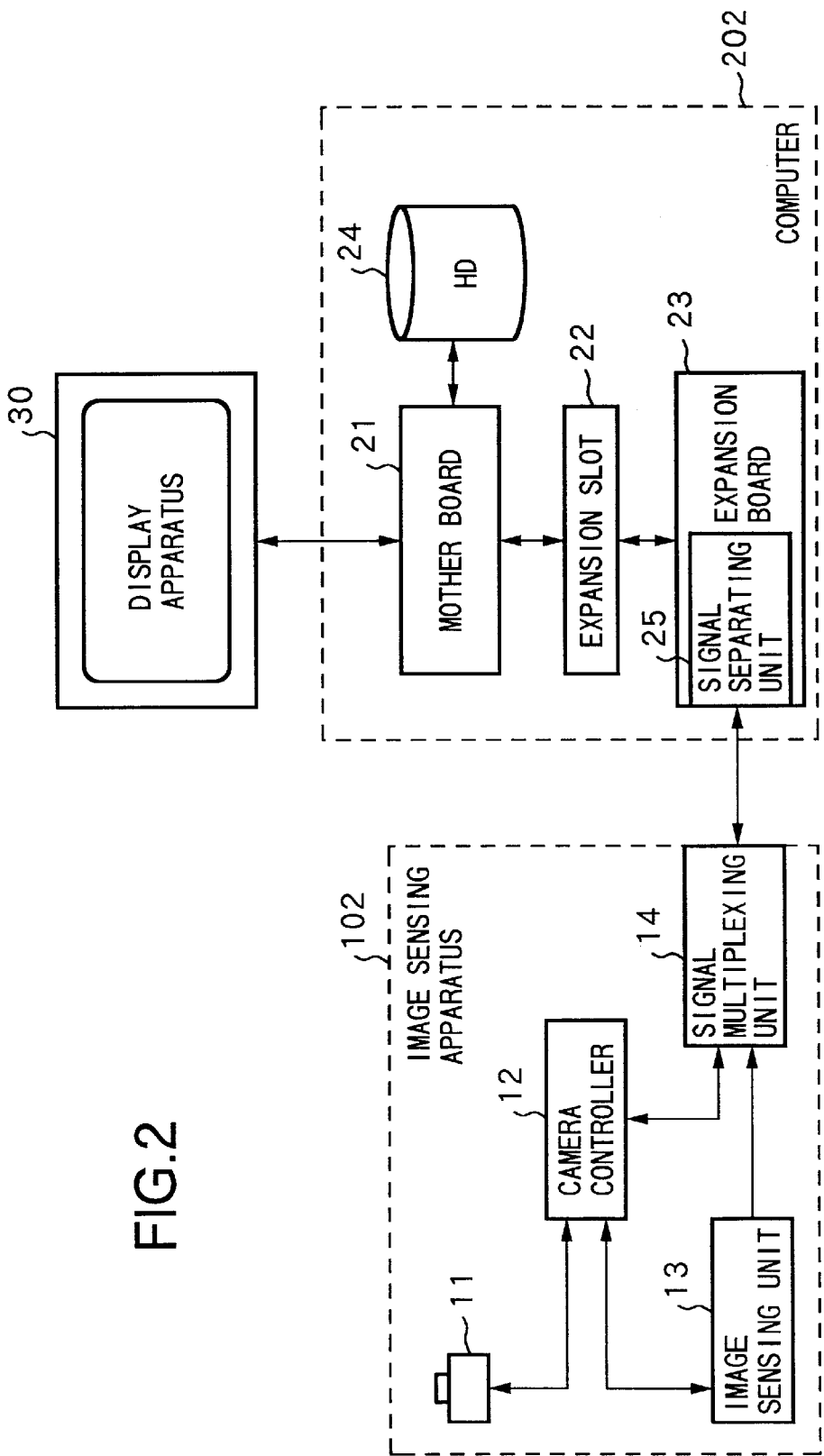
FIG. 2 is a block diagram illustrating a configuration of an image sensing system according to a first modification of the first embodiment of the present invention.

FIG. 2 is a block diagram illustrating a configuration of an image sensing system according to the first modification of the first embodiment of the present invention.

In the first modification of the first embodiment, the configuration of the image sensing system is distinguished from that shown in FIG. 1 by a signal multiplexing unit 14 in the image sensing apparatus 102 and a signal separating unit 25 added to the expansion board 23 in the computer 202. Other units and elements are the same as those explained in the first embodiment with reference to FIG. 1, therefore, the explanation of those are omitted.

Next, an operation of the image sensing system is explained. The difference between the first modification of the first embodiment and the first embodiment is that an application execution request signal outputted from the camera controller 12 of the image sensing apparatus 102 to the expansion board 23 and an image signal outputted from the image sensing unit 13 to the expansion board 23 are multiplexed by the signal multiplexing unit 14, thereafter, transmitted to the expansion board 23 in the first modification of the first embodiment. Further, in the expansion board 23, the newly added signal separation unit 25 separates the multiplexed signal into the application execution request signal and the image signal. The separated signals are independently transmitted from the expansion board 23.

Out of the separated signals, the image signal is displayed on the display apparatus 30 via the expansion slot 22 and the mother board 21. Regarding the application execution request signal, it is transmitted to the mother board 21 via the expansion slot 22. When the mother board 21 receives the application execution request signal, similarly to the first embodiment, it executes a predetermined application program, such as a TV conference application program or an image editorial application program, stored in the hard disk 24 when the application program is not running, and the display 30 displays dialog between the user and the application.

According to the first modification of the first embodiment as described above, a signal from the camera controller of the image sensing apparatus and an image signal from the image sensing unit are multiplexed, and the multiplexed signal is separated in a separating unit of the computer. Accordingly, without increasing the number of signal lines of a cable connecting between the image sensing apparatus and the computer, it is possible to automatically execute a predetermined application program which is set to be executed in response to a pressing operation of the shutter button of the image sensing device without interfacing with the operator when the application is not being executed.

Second Modification of the First Embodiment

Figure 3:
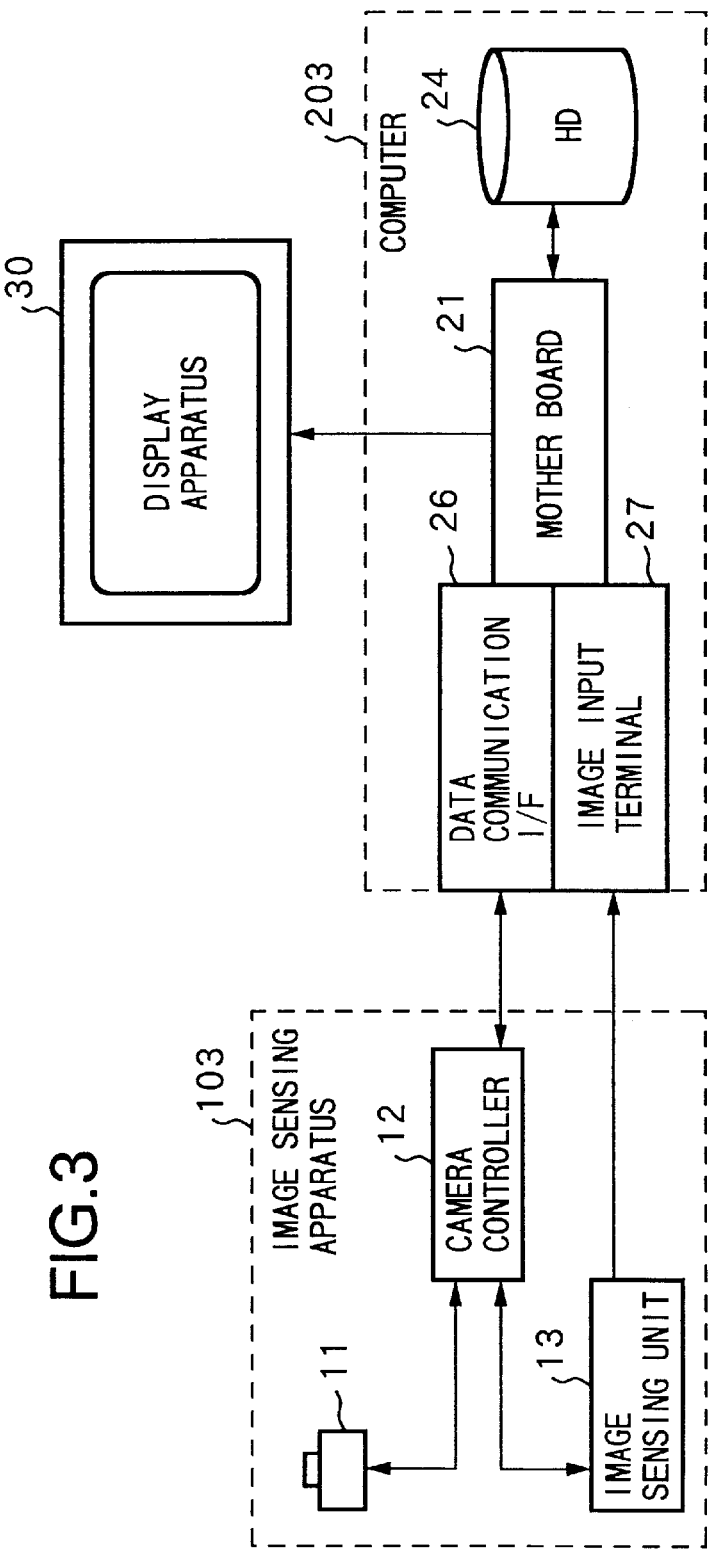
FIG. 3 is a block diagram illustrating a configuration of an image sensing system according to a second modification of the first embodiment of the present invention.

FIG. 3 is a block diagram illustrating a configuration of an image sensing system according to the second modification of the first embodiment of the present invention.

In the second modification of the first embodiment, the configuration of the image sensing system is distinguished from that shown in FIG. 1 since the expansion board 23 and the expansion slot 22 are not provided in the computer 203, and a data communication interface (I/F) 26 and an image input terminal 27 are mounted on the computer 203. The data communication I/F 26 is an interface for exchanging data between the camera controller 12 of the image sensing apparatus 103 and the mother board 21, the main processing unit of the computer 203. The image input terminal 27 is an interface for taking an image signal transmitted from the image sensing apparatus 103 to the mother board 21 of the computer 203.

Next, an operation of the image sensing system is explained. When the camera controller 12 detects that the shutter button 11 is pressed, an application execution request signal is transmitted to the data communication I/F 26. The received application execution request signal is passed to the mother board 21 from the data communication I/F 26. When receiving the application execution request signal, the mother board 21 executes a predetermined application program, such as a TV conference application program or an image editorial program, stored in the hard disk 24. After the application program is initiated, an image transmitted from the image sensing unit 13 of the image sensing apparatus 103 and dialog between the user and the application executed on the computer 203 are displayed on the display apparatus 30.

According to the second modification of the first embodiment as described above, since the data communication I/F and the image input terminal are installed in the mother board, it is possible to connect an image sensing apparatus and the computer without using an expansion board for connecting between the image sensing apparatus and the computer. Further, when the application is not being executed, a predetermined application program is automatically initiated by pressing the shutter button of the image sensing device without interfacing with the operator.

Third Modification of the First Embodiment

Figure 4:
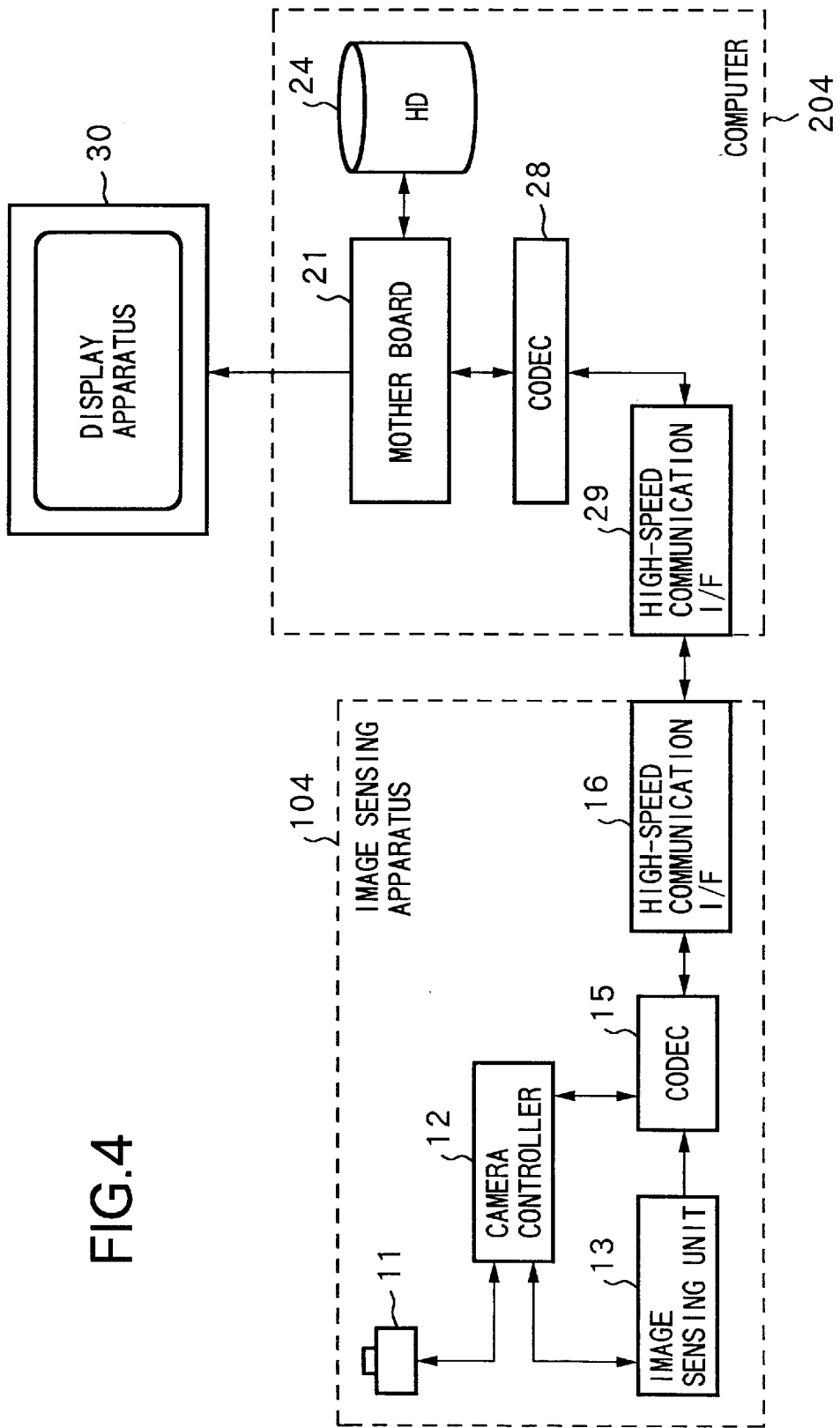
FIG. 4 is a block diagram illustrating a configuration of an image sensing system according to a third modification of the first embodiment of the present invention.

FIG. 4 is a block diagram illustrating a configuration of an image sensing system according to the third modification of the first embodiment of the present invention.

In the third modification of the first embodiment, the configuration of the image sensing system is distinguished from that shown in FIG. 1 by codecs 15 and 28 and high-speed communication interfaces (I/F) 16 and 29 provided in the image sensing apparatus 104 and the computer 204, respectively.

Next, an operation of the image sensing system is explained. When the camera controller 12 of the image sensing apparatus 104 detects that the shutter button 11 is pressed, an application execution request signal from the camera controller 12 and an image signal from the image sensing unit 13 are encoded by the codec 15, then transmitted from the high-speed communication I/F 16 to the high-speed communication I/F 29 of the computer 204. In the computer 204, the codec 29 decodes the signal received via the high-speed communication I/F 29. The decoded application execution request signal and the image signal are inputted to the mother board 21. When detecting the application execution request signal, the mother board 21 executes a predetermined application program stored in the hard disk 24. After the application program is initiated, the image signal decoded by the codec 28 and dialog between the user and the application executed on the computer 204 are displayed on the display apparatus 30.

In a case of using a standard high-speed serial interface, such as a universal serial bus (USB) interface or P1394 interface, by providing USB or P1394 interface and a function capable of executing an application to the display device 30, it is possible to achieve the same advantage as that of the first embodiment by directly connecting the image sensing apparatus 104 to the display apparatus 30 without the computer 204.

According to the third modification of the first embodiment as described above, an image sensing apparatus is connected to a computer via a single cable using a high-speed communication interface, and, when a predetermined application is not being executed, the application program is automatically initiated by pressing the shutter button of the image sensing device without interfacing with the operator.

Other Modifications

In the first embodiment to third modifications of the first embodiment, the predetermined application program is stored in the hard disk 24 and, when the mother board 21 executes the application program, it accesses the hard disk 24. However, the present invention is not limited to this, and the application program may be stored in a CD-ROM. In such cases, the mother board 21 accesses the CD-ROM when executing the application.

Further, the application may be stored in other media, such as a floppy disk, a Zip™ floppy disk and CD-R, and the mother board 21 accesses respective media when executing the application.

Further, in a case where buttons and switches, such as a power switch, a shutter button which has different operation levels (e.g., half-stroke and full-stroke), an automatic focusing button, a white balance button, and a zoom button, are provided in the image sensing apparatus other than the shutter button for sensing a still image, it is possible to add a function for initiating an application by operating one of these buttons and switches, or operating these buttons and switches in different combinations.

Further, in the first embodiment, when the camera controller 12 detects that the shutter button 11 is pressed, it transmits an application execution request signal to the expansion board 23 as well as switches the type of image signal to be outputted from the image sensing unit 13 from a moving image signal to a still image signal. However, the present invention is not limited to this, and when a predetermined application is not being executed in the computer 201, while keeping transmitting a moving image signal, the camera controller 12 may transmit the application execution request signal to the expansion board 23 to instruct the mother board 21 to execute the application via the expansion slot 22. Accordingly, on the display apparatus 30, a moving image sensed by the image sensing unit 13 of the image sensing apparatus 101 and dialog between the user and the application executed on the computer 201 are displayed.

According to the first embodiment to third modifications of the first embodiment as described above, by operating the image sensing apparatus, a predetermined application program, such as a TV conference application program, an image editorial application program, a TV phone application program, and an OCR application program, is automatically initiated.

Note, in the first embodiment to third modifications of the first embodiment, an image sensing apparatuses 101 to 104, such as a camera, are connected to computers 201 to 204 to configure an image sensing system, however, the present invention can be applied to any data input apparatus, in addition to an image sensing apparatus, having any trigger means, such as a switch button. For example, when a sound input apparatus is connected to the computers 201 to 204, an application for processing sound may be executed in response to a predetermined operation of the sound input apparatus. In such cases, the data input apparatus generates an application execution request signal in response to an operation of the trigger means and transmits the signal to the computer; in turn, the computer executes a predetermined application which is set to be initiated in response to the application execution request signal.

Second Embodiment

Figure 5:
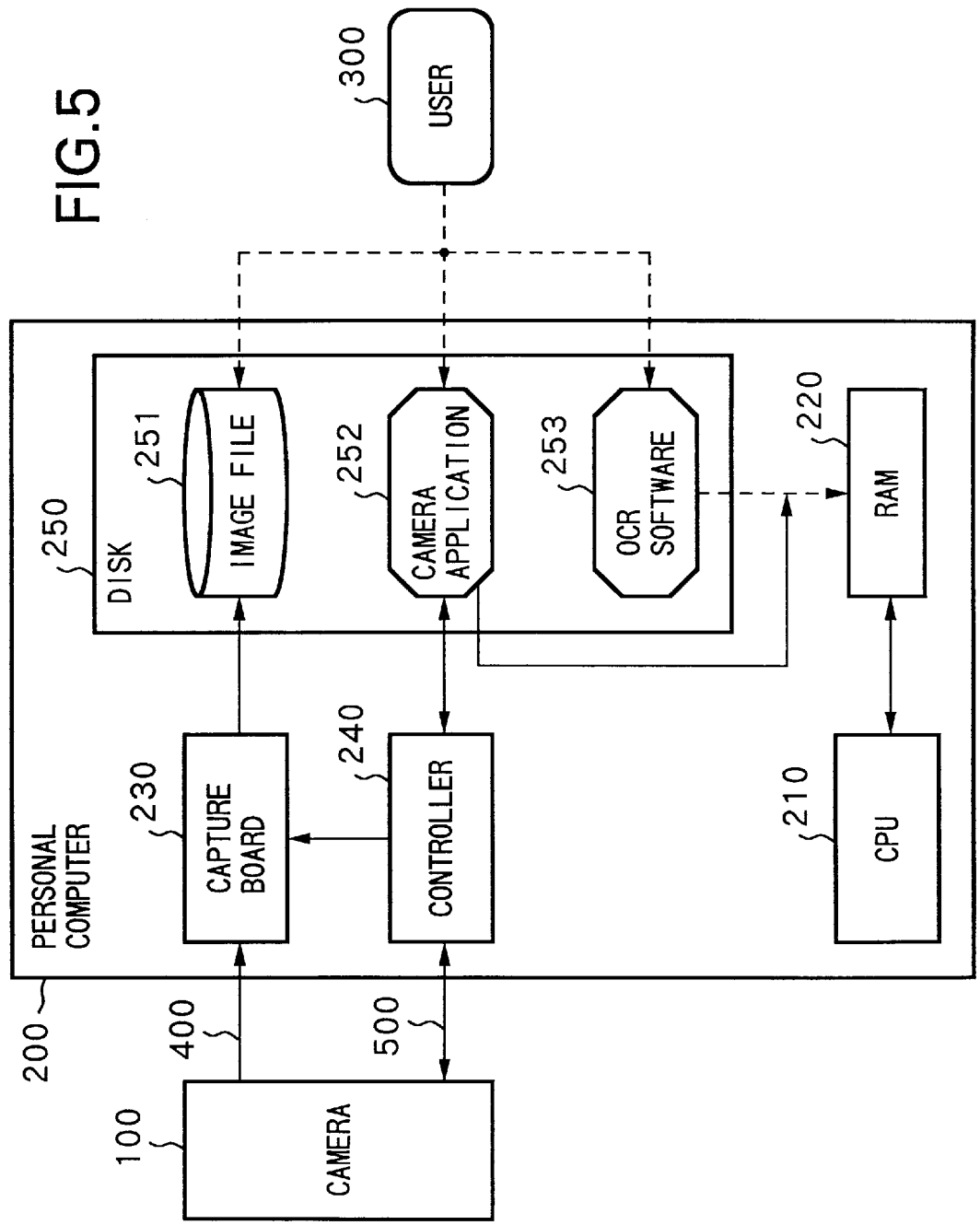
FIG. 5 is a block diagram illustrating a configuration of an image sensing system according to a second embodiment of the present invention.
Figure 6:
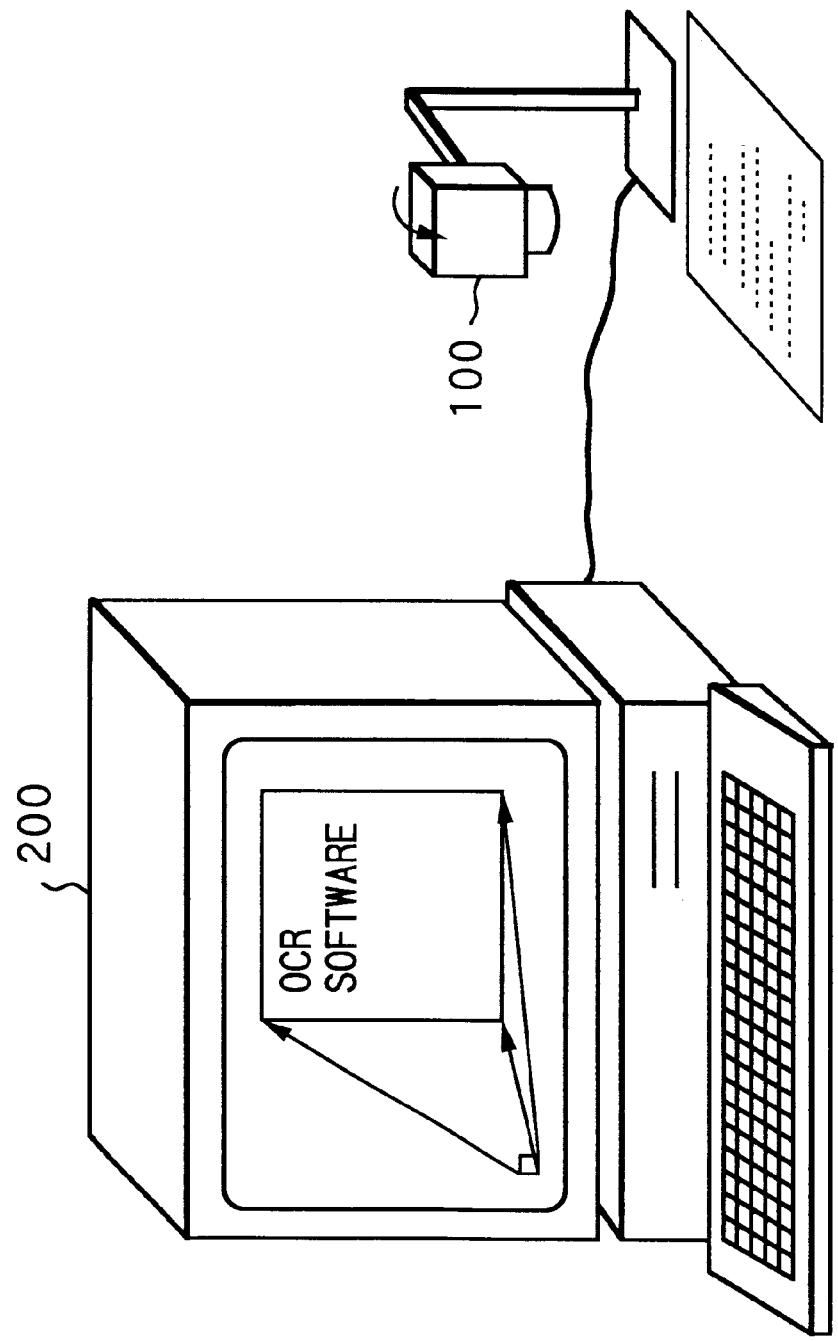
FIG. 6 is an external view of the image sensing system according to the second embodiment of the present invention.

FIG. 5 is a block diagram illustrating a configuration of an image sensing system according to the second embodiment of the present invention, and FIG. 6 is an external view of the image sensing system.

In FIG. 5, reference numeral 100 denotes a camera capable of operating in a document mode and a non-document mode; 200, a personal computer; 210, a CPU; 220, a RAM used for executing an application software; 230, a capture board for capturing an image sensed by the camera 100; 240, a controller for controlling the capture board 230 and the camera 100; 251, an image file of the captured image; 252, a user interface (referred to as "camera application" hereinafter) for controlling the camera 100 and other necessary units; 253, an optical character recognition (OCR) software which is frequently used when a document image is captured; 250, a disk for storing the image file 251 and the application softwares 252 and 253; 300, a user; 400, an image signal channel for transmitting an image signal from the camera 100; and 500, a control signal channel for performing bidirectional communication between the camera 100 and the controller 240. In FIG. 5, some devices, such as a monitor and a keyboard, which are commonly connected to the computer 200 are not shown.

The camera 100 and the personal computer 200 are arranged as shown in FIG. 6 and connected via a cable.

Figure 7:
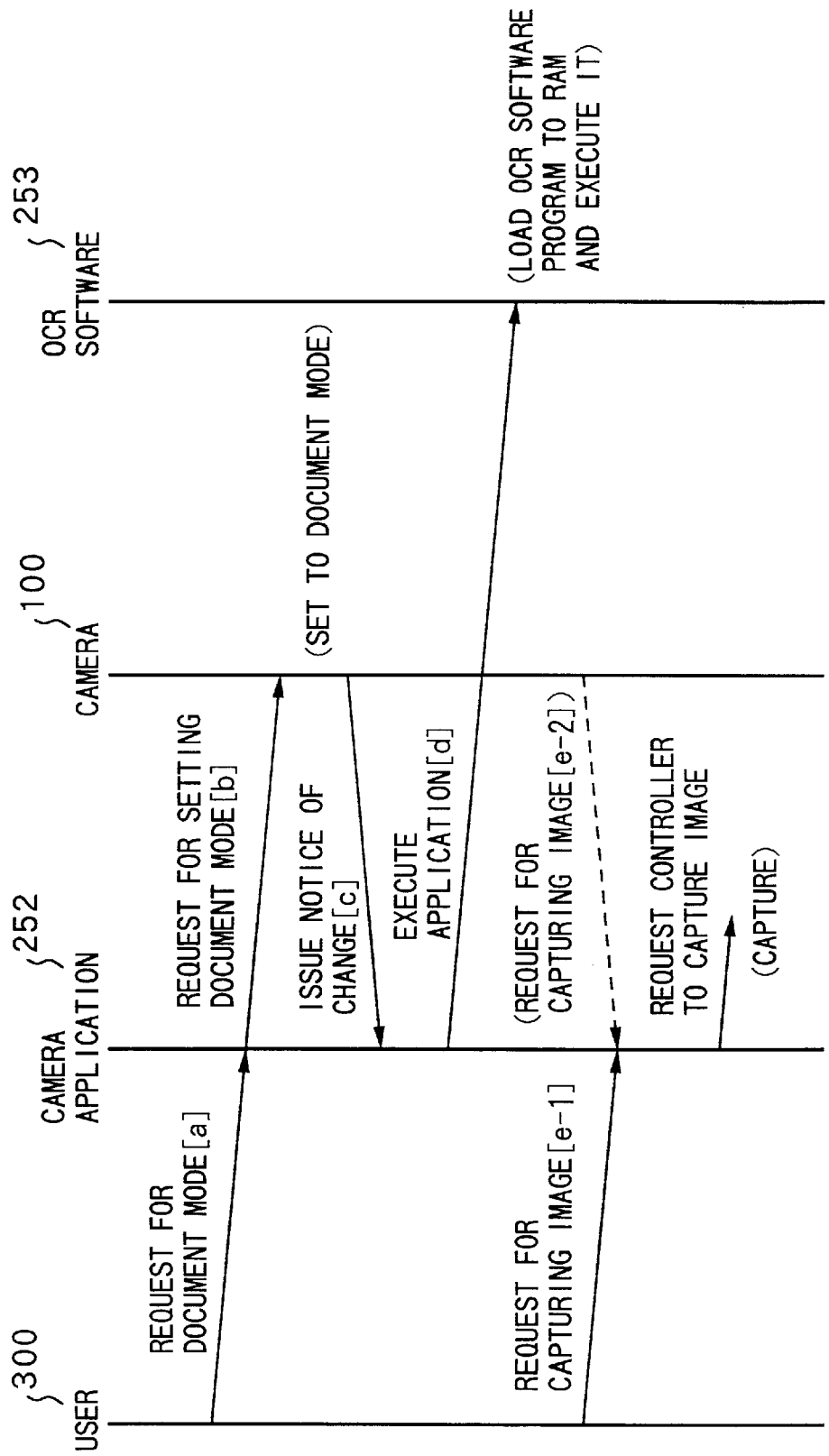
FIG. 7 is an explanatory view showing an operational sequence of the image sensing system according to the second embodiment of the present invention.

An operational sequence and a flow of the operation of the image sensing system as shown in FIG. 5 are explained with reference to FIG. 7. FIG. 7 is an explanatory view showing the operational sequence of switching an image sensing mode of the image sensing system to the document mode.

First, the user inputs a request for sensing an image in the document mode to the controller 240 [a]. In turn, the controller 240 issues a request for setting the document mode to the camera 100. Note, the setting of the document mode in the camera 100 in the second embodiment is instructed by the computer. In response to the request, the camera 100 changes image sensing operation from an operation suitable for sensing a still or moving image, to an operation suitable for sensing a document image, thereby changing from the non-document mode to the document mode. Upon changing to the document mode, the camera 100 issues a notice indicating that the mode is changed to the document mode via the control signal channel 500 [c]. This notice is inputted to the camera application 252 via the controller 240. In turn, the camera application 252 downloads the OCR software for processing a document image to the RAM 220, and executes the OCR software [d].

Thereafter, the user 300 issues a request for capturing a sensed image, thereby the image is inputted to the computer 200 and stored as the image file 251 [e-1, e-2]. Note, there are two ways to issue the request for capturing an image: by operating the camera application 252 [e-1]; and by pressing a switch provided on the camera 100 [e-2].

It is possible to make the executed OCR software 253 to automatically start processing on the captured document image by reading the image file 251 and recognizing characters of the document image.

Figure 8:
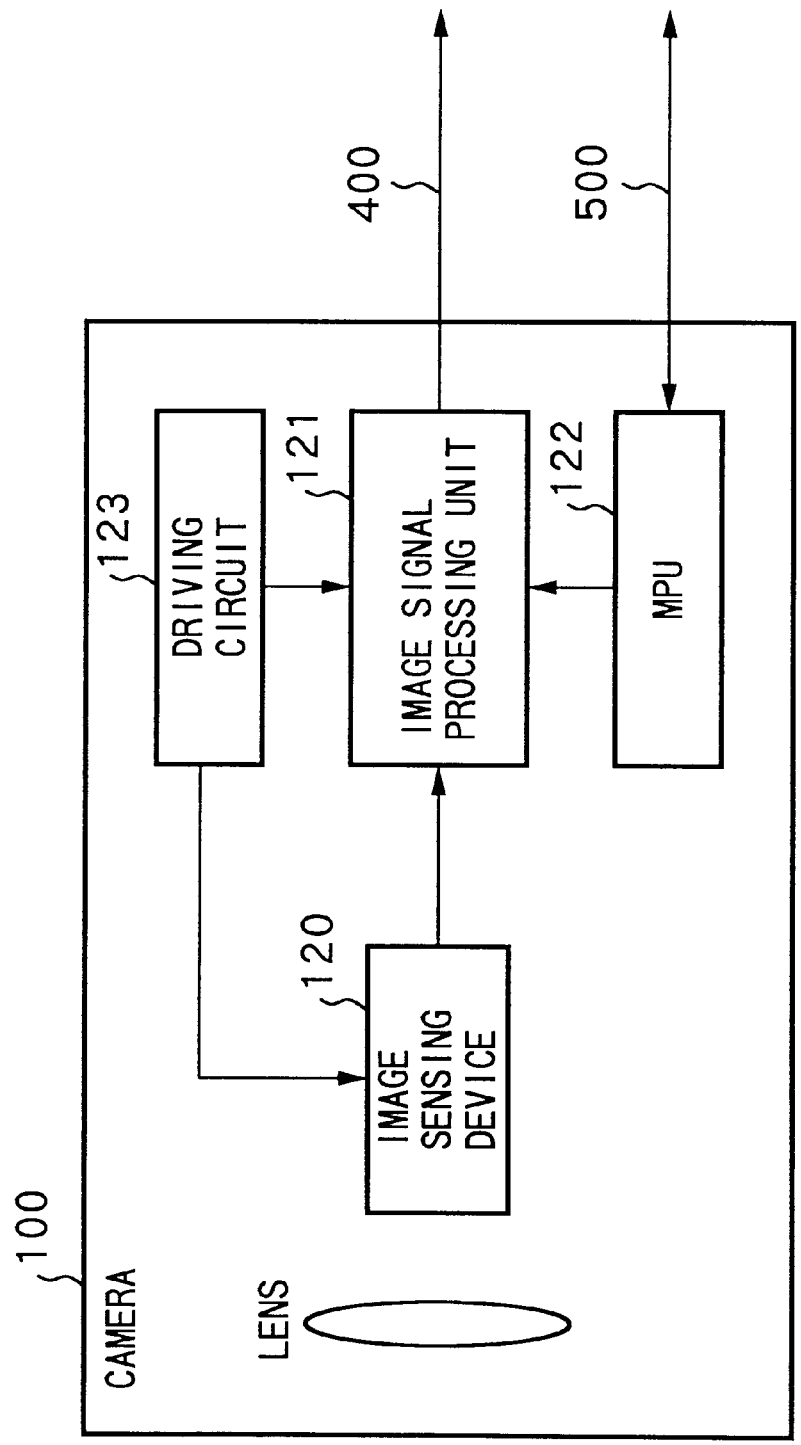
FIG. 8 is a block diagram illustrating a configuration of a camera used in the image sensing system shown in FIG. 5.

FIG. 8 is a block diagram illustrating a configuration of the camera 100 which performs monochromatic image processing when sensing an image in the document mode. In FIG. 8, reference numeral 120 denotes an image sensing device; 121, an image signal processing unit; 122, a micro processing unit (MPU); and 123, a driving circuit of the image sensing device 120. When the MPU 122 receives a request for setting the document mode via the control signal channel 500, it issues a request to perform monochromatic image processing to the image signal processing unit 121. Accordingly, the camera 100 is set to the document mode.

Figure 9:
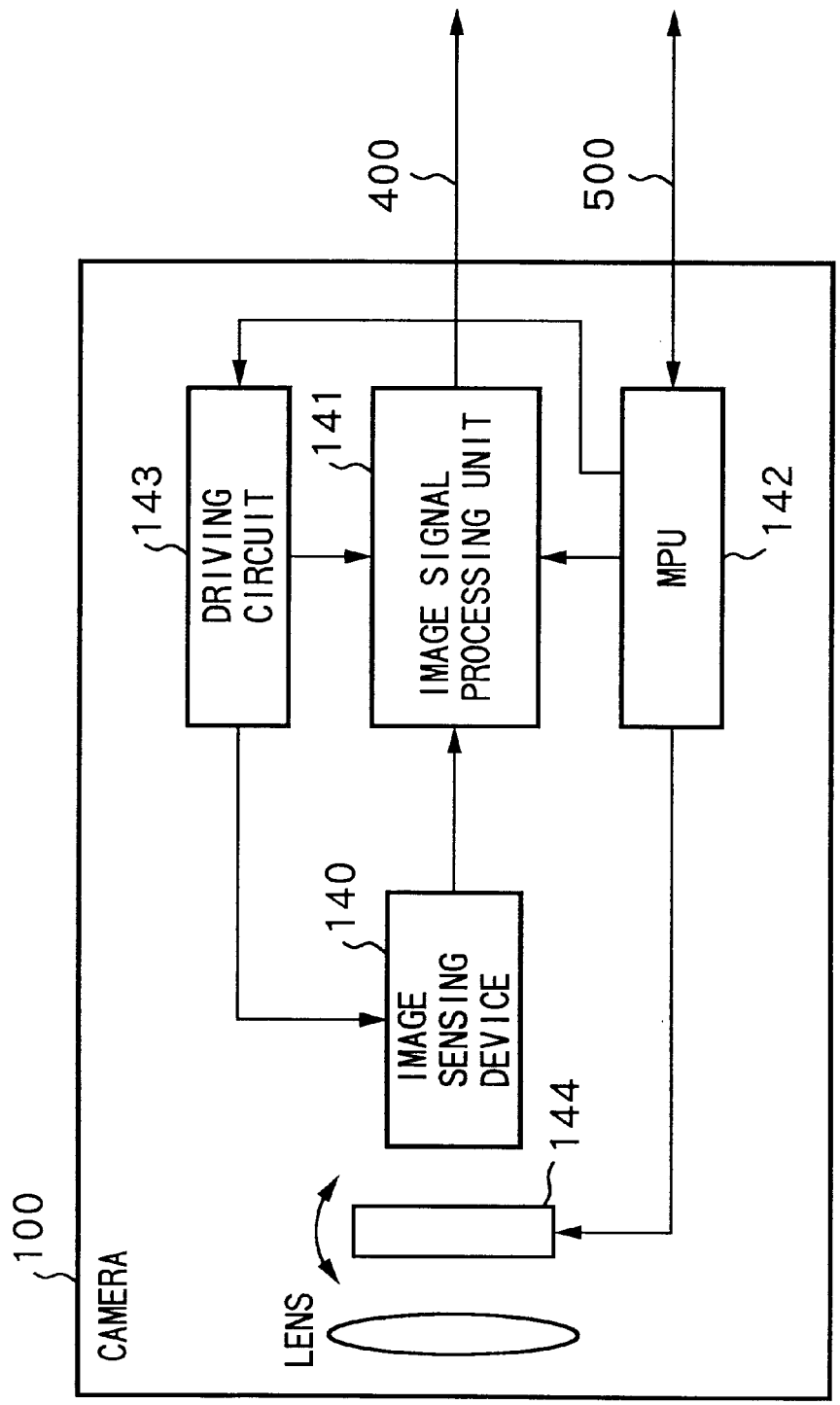
FIG. 9 is a block diagram illustrating another configuration of a camera used in the image sensing system shown in FIG. 5.

FIG. 9 is a block diagram illustrating another configuration of the camera 100 capable of performing pixel shifting operation to obtain a high-resolution image. This camera does not perform the pixel shifting operation in the non-document mode, and performs the pixel shifting operation in the document mode. In FIG. 9, reference numeral 140 denotes an image sensing device; 141, an image signal processing unit; 142, an MPU; 143, a driving circuit of the image sensing device 140; and 144, a plane parallel plate used in the pixel shifting operation.

When the MPU 142 receives the document mode request via the control signal channel 500, it issues a request to perform the pixel shifting operation to the image signal processing unit, the driving circuit 143 and the plane parallel plate 144. Accordingly, the camera 100 is set to the pixel shifting mode, i.e., the document mode, in this case.

Note, since the camera 100 can be remote-controlled in the second embodiment, it is possible to realize the image sensing system having a camera and a computer connected via a network.

Note, the capture board 230 is not limited to an expansion-bus type, and may be replaced by a PC card, or an I/O port capable of receiving an image. Further, the controller 240 may be an MPU or application specific integrated circuit (ASIC), or may be a device driver of the I/O port. Furthermore, the disk 250 may be replaced by other recording medium, such as a tape. Further, the OCR software 253 may be replaced by other application program for processing an image.

According to the second embodiment as described above, since the OCR software 253 is automatically initiated when changing the non-document mode to the document mode, the OCR process can be effectively initiated.

Third Embodiment

In the third embodiment, a case where the processing of changing from the non-document mode to the document mode is performed by directly instructing a camera to do so is explained. The configuration of the image sensing system is the same as that explained in the second embodiment with reference to FIG. 5 except the configuration of the camera, therefore, the explanation of it is omitted.

Figure 10:
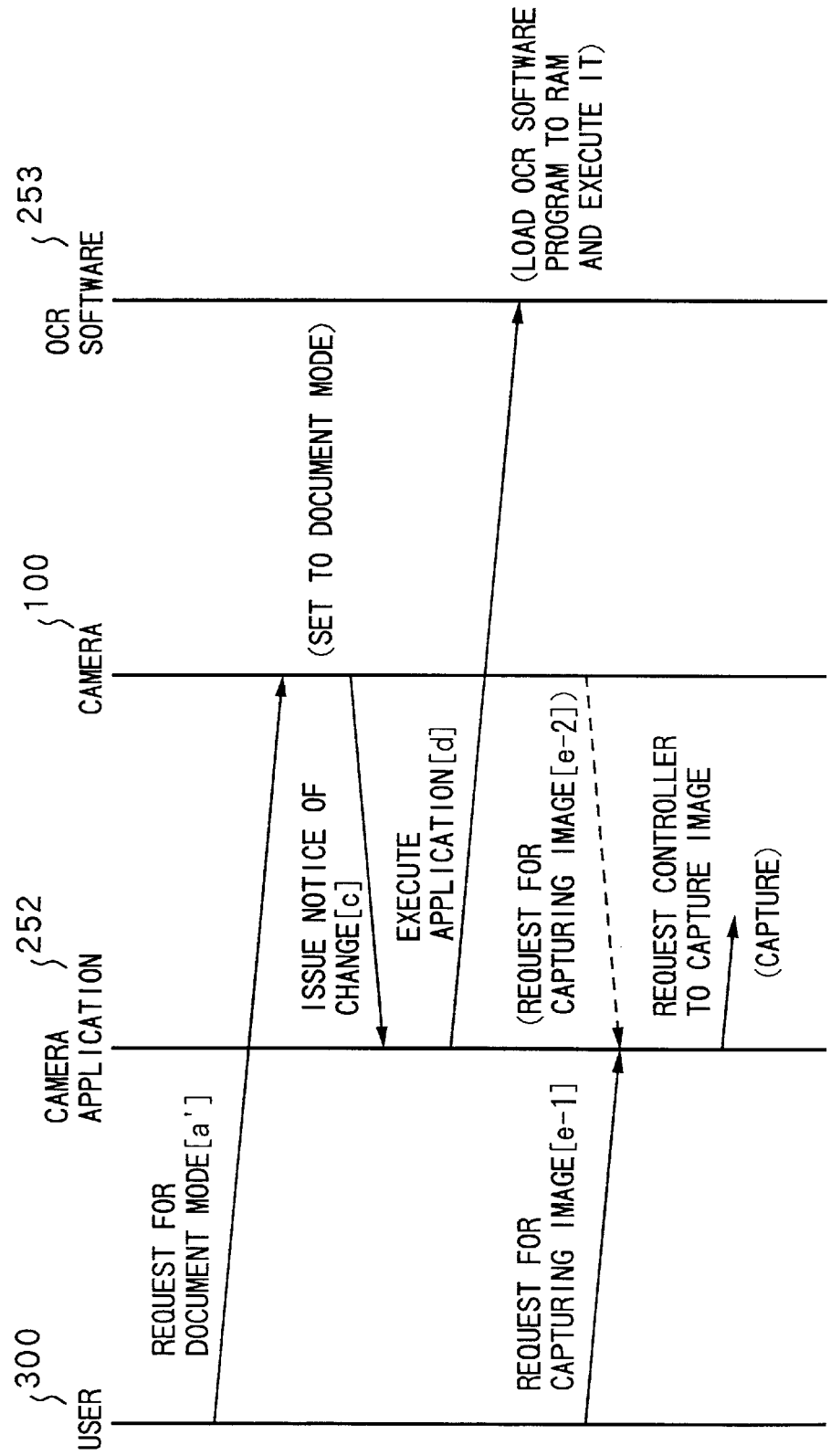
FIG. 10 is an explanatory view showing an operational sequence of an image sensing system according to a third embodiment of the present invention.

FIG. 10 is an explanatory view showing an operational sequence of switching to the document mode.

First, the user directly inputs a request for sensing an image in the document mode to the camera 100 by pressing a switch of the camera 100 without operating the camera application 252 [a'], thereby the non-document mode is changed to the document mode in the camera 100. Then, the camera 100 issues a notice indicating that the mode is changed to the document mode via the control signal channel 500 [c]. The notice is inputted to the camera application 252 via the controller 240. In turn, the camera application 252 down-loads the OCR software for processing a document image to the RAM 220, and executes the OCR software [d].

Thereafter, the user 300 issues a request for capturing a sensed image, thereby the image is inputted to the computer 200 and stored as the image file 251 [e-1, e-2]. Note, there are two ways to issue the request for capturing an image: by operating the camera application 252 [e-1]; and by pressing a switch provided on the camera 100 [e-2].

Next, the camera 100 capable of operating in the document mode and the non-document mode, used in the image sensing system, according to the third embodiment is explained.

FIG. 11 is a block diagram illustrating a configuration of the camera 100 whose head can tilt. In this camera, when the head of the image sensing device is in upright position or tilted upward, it is set to the non-document mode, whereas when the head the image sensing device is tilted downward, then it is set to the document mode. In FIG. 11, reference numeral 110 denotes an image sensing device; 111, an image signal processing unit; 112, an MPU; 113, a driving circuit of the image sensing device 111; 114, a camera head which can be moved in the tilting direction; and 115, a direction detector.

The direction detector 115 detects whether the image sensing device 111 is in the upright position or tilted upward, or tilted downward, and outputs the detected result to the MPU 112. The MPU 112 checks the detected result of the camera head 114, and when it determines that the camera head 114 is tilted downward, it outputs a notice of the document mode via the control signal channel 500.

FIG. 12 is a block diagram illustrating another configuration of the camera 100. In FIG. 12, reference numeral 130 denotes an image sensing device; 131, an image signal processing unit; 132, an MPU; 133, a driving circuit of the image sensing device 130; and 134 is a switch for setting either the non-document mode or the document mode.

In order to switch to the document mode, the user 300 operates the switch 134. The MPU 132 determines the state of the switch 134, and if it determines that the switch 134 is set to the document mode, it issues a notice of the document mode via the control signal channel 500 as well as issues a request for performing monochromatic signal processing to the image signal processing unit 131.

According to the third embodiment as described above, since the OCR software 253 is automatically initiated when the non-document mode is changed to the document mode, the OCR processing can be effectively initiated.

Note, in the second and third embodiments, an image signal and a control signal are transmitted via different signal lines, however, the present invention is not limited to this, and can be transmitted using a single signal line, as shown in the first and third modification of the first embodiment, by providing multiplexing and separation units or codecs.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus capable of connecting to an information processing apparatus which stores an application program, comprising:
   an operation member adapted to start a shutter operation or change mode;
   a signal generator adapted to generate a predetermined signal requesting to start up the application program stored in the information processing apparatus in response to an operation of said operation member; and
   a communicator adapted to send the predetermined signal generated by said signal generator to said information processing apparatus.

2. The image sensing apparatus according to claim 1, wherein said operation member includes a shutter button.

3. The image sensing apparatus according to claim 2 further comprising:
   an image sensor adapted to sense an object and output an image signal; and
   a controller adapted to control said image sensor so as to output a still image signal in response to the operation of the shutter button.

4. The image sensing apparatus according to claim 1, wherein said operation member includes one or more buttons or switches.

5. The image sensing apparatus according to claim 1 further comprising multiplexing means for multiplexing an image signal and the predetermined signal generated by said signal generator,
   wherein said communicator transmits a multiplexed signal obtained by said multiplexing means.

6. The image sensing apparatus according to claim 1, wherein said communicator includes:
   a first unit adapted to exchange control signals including the predetermined signal generated by said signal generator; and
   a second unit adapted to transmit an image signal.

7. The image sensing apparatus according to claim 1 further comprising encoding means for encoding the predetermined signal generated by said signal generator and an image signal,
   wherein said communicator transmits a signal encoded by said encoding means.

8. The image sensing apparatus according to claim 1, wherein said communicator is a universal serial bus interface.

9. The image sensing apparatus according to claim 1, wherein said communicator is a P1394 interface.

10. The image sensing apparatus according to claim 1, wherein said software application comprises a TV conference program, a TV phone program or image processing program.

11. A system having an information processing apparatus which stores an application program and a data input apparatus, comprising:
    an operation member adapted to start a shutter operation or change mode;
    a signal generation generator adapted to generate a predetermined signal requesting to start up the application program stored in the information processing apparatus in response to an operation of said operation member;
    a communicator adapted to transmit the predetermined signal generated by said signal generator from the data input apparatus to the information processing apparatus; and
    a controller adapted to automatically start up the application program in response to the predetermined signal transmitted via said communicator.

12. The system according to claim 11 further comprising:
    multiplexing means for multiplexing a signal obtained as a result of operation of the data input apparatus and the predetermined signal generated by said signal generator; and
    separation means for separating the predetermined signal from the signal transmitted via said communicator,
    wherein said communicator transmits a multiplexed signal obtained by said multiplexing means.

13. The system according to claim 12, wherein the data input apparatus is an image sensing apparatus, and the signal obtained as a result of operation of the data input apparatus is an image signal.

14. The system according to claim 11, wherein said communicator includes:
    a first unit, adapted to exchange control signals including the predetermined signal; and
    a second unit adapted to transmit a signal obtained as a result of operation of the data input apparatus.

15. The system according to claim 14, wherein the data input apparatus includes an image sensing apparatus, and the signal obtained as a result of operation of the data input apparatus includes an image signal.

16. The system according to claim 11 further comprising:
encoding means for encoding the predetermined signal generated by said signal generator and a signal obtained as a result of operation of the data input apparatus; and
decoding means for decoding a signal transmitted via said communicator,
wherein said communicator transmits a signal encoded by said encoding means.

17. The system according to claim 11, wherein said communicator is a universal serial bus (USB) interface.

18. The system according to claim 11, wherein said communicator is a P1394 interface.

19. The system according to claim 16, wherein the data input apparatus is an image sensing apparatus, and the signal obtained as a result of operation of the data input apparatus is an image signal.

20. The system according to claim 11 further comprising a storage device, which is communicatively coupled to the information processing apparatus, for storing the predetermined software application.

21. The system according to claim 11 further comprising a display apparatus for displaying an image on the basis of data inputted by the data input apparatus and dialog of the predetermined application.

22. The system according to claim 19, wherein said operation means is a shutter button.

23. The system according to claim 22 further comprising:
image sensing means for sensing an object and outputting an image signal; and
control means for controlling said image sensing means so as to output a still image signal in response to the operation of the shutter button.

24. The system according to claim 19, wherein said operation means includes one or more buttons or switches.

25. The system according to claim 11, wherein said software application comprises a TV conference program, a TV phone program or image processing program.

26. A method for controlling an information processing apparatus capable of connecting to an external data input apparatus having an operation member for starting a shutter operation or for changing mode, comprising:
a receiving step of receiving a signal from the external data input apparatus; and
a control step of starting up a predetermined application program when a predetermined signal requesting to start up the application program generated in response to an operation of said operation member is received in said receiving step.

27. The method according to claim 26 further comprising a step of separating a predetermined signal from the signal received in said receiving step.

28. The method according to claim 26, wherein, in said receiving step, control signals including the predetermined signal and a signal obtained as a result of operation of the external data input apparatus are received via different communication lines.

29. The method according to claim 28, wherein the external data input apparatus is an image sensing apparatus, and the signal obtained as a result of operation of the external data input apparatus is an image signal.

30. The method according to claim 26 further comprising a step of decoding the signal received in said receiving step.

31. The method according to claim 26, wherein said software application comprises a TV conference program, a TV phone program or image processing program.

32. A method for controlling a system having an information processing apparatus which stores an application program and a data input apparatus having an operation member for starting a shutter operation or for changing mode, comprising:
a detecting step of detecting a predetermined operation by said operation member in the data input apparatus;
a generating step of generating a predetermined signal requesting to start up the application program stored in the information processing apparatus when the predetermined operation is detected in said detecting step;
a communication step of transmitting the predetermined signal from the data input apparatus to the information processing apparatus; and
a control step of starting up the application program in the information processing apparatus in response to the predetermined signal transmitted in said communication step.

33. The method according to claim 32 further comprising:
a multiplexing step of multiplexing a signal obtained as a result of operation of the data input apparatus and the predetermined signal generated in said generating step; and
a separation step of separating the predetermined signal from the signal transmitted in said communication step,
wherein, in said communication step, a multiplexed signal obtained in said multiplexing step is transmitted.

34. The method according to claim 32, wherein the data input apparatus includes an image sensing apparatus, and the signal obtained as a result of operation of the data input apparatus includes an image signal.

35. The method according to claim 32, wherein, in said communication step, control signals including the predetermined signal and a signal obtained as a result of operation of the data input apparatus are transmitted via different communication lines.

36. The method according to claim 35, wherein the data input apparatus is an image sensing apparatus, and the signal obtained as a result of operation of the data input apparatus is an image signal.

37. The method according to claim 32 further comprising:
an encoding step of encoding the predetermined signal generated in said generating step and a signal obtained as a result of operation of the data input apparatus; and
a decoding step of decoding a signal transmitted in said communication step,
wherein, in said communication step, the signal encoded in said encoding step is transmitted.

38. The method according to claim 37, wherein the data input apparatus is an image sensing apparatus, and the signal obtained as a result of operation of the data input apparatus is an image signal.

39. The method according to claim 30 further comprising an image sensing step of sensing an object and outputting an image signal,
wherein, when the predetermined operation is detected in said detecting step, a still image signal is outputted in said image sensing step.

40. The method according to claim 32, further comprising a display step of displaying an image on the basis of data inputted by the data input apparatus and dialog of the predetermined software application.

41. The method according to claim 32, wherein said software application comprises a TV conference program, a TV phone program or image processing program.

42. A computer program product comprising a computer usable medium having computer readable program code means embodied in said medium for controlling an information processing apparatus capable of connecting to an external data input apparatus having an operation member for starting a shutter operation or for changing mode, said product including:

first computer readable program code for receiving a signal from the external data input apparatus; and second computer readable program code for starting up a predetermined software application program when a predetermined signal requesting to start up the application program generated in response to an operation of said operation member is received by said first computer readable program code.

43. The computer program product according to claim 42 further comprising third computer readable program code means for separating a predetermined signal from the signal received by said first computer readable program code means.

44. The computer program product according to claim 42 further comprising fourth computer readable program code means for decoding the signal received by said first computer readable program code means.

45. The computer program product according to claim 42, wherein said software application comprises a TV conference program, a TV phone program or image processing program.

* * * * *